US011087342B1

(12) United States Patent
McEntire et al.

(10) Patent No.: US 11,087,342 B1
(45) Date of Patent: Aug. 10, 2021

(54) PROMOTION PROCESSING SYSTEM INCLUDING CHATBOT BASED IMAGE VOTING AND RELATED METHODS

(71) Applicant: Inmar Clearing, Inc., Winston-Salem, NC (US)

(72) Inventors: O'Ryan McEntire, Seattle, WA (US); Gregory Clem, Seattle, WA (US); Nathanael Georgeson, Seattle, WA (US); Jeffery Hayes, Seattle, WA (US); Samuel May, Kent, WA (US); Zackary Smith, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 15 days.

(21) Appl. No.: 16/660,280

(22) Filed: Oct. 22, 2019

(51) Int. Cl.
| | |
|---|---|
| *G06Q 30/02* | (2012.01) |
| *G06Q 50/00* | (2012.01) |
| *H04L 12/58* | (2006.01) |
| *G06K 9/00* | (2006.01) |
| *H04W 88/02* | (2009.01) |
| *H04N 1/00* | (2006.01) |

(52) U.S. Cl.
CPC ..... *G06Q 30/0203* (2013.01); *G06K 9/00664* (2013.01); *G06Q 30/0218* (2013.01); *G06Q 30/0239* (2013.01); *G06Q 50/01* (2013.01); *H04L 51/02* (2013.01); *H04N 1/00209* (2013.01); *H04N 1/00244* (2013.01); *H04N 2201/0084* (2013.01); *H04W 88/02* (2013.01)

(58) Field of Classification Search
CPC .......... G06Q 30/0267; H04M 1/72555; H04W 4/12; G06K 7/1417; H04L 51/02

USPC ........................................... 705/14.64, 14.25
See application file for complete search history.

(56) References Cited

U.S. PATENT DOCUMENTS

| | | | |
|---|---|---|---|
| 8,200,262 | B2 | 6/2012 | McGary et al. |
| 8,498,946 | B1 | 7/2013 | Parekh et al. |
| 10,140,620 | B2 | 11/2018 | Heath |

(Continued)

FOREIGN PATENT DOCUMENTS

CN      2784194 Y   *   5/2006

OTHER PUBLICATIONS

Brian Westfall, 3 HR Chatbots That Are Disrupting Employee Experience, 2019 (Year: 2019).*

*Primary Examiner* — Tarek Elchanti
(74) *Attorney, Agent, or Firm* — Allen, Dyer, Doppelt + Gilchrist, P.A.

(57) ABSTRACT

A promotion processing system may include user devices that may include a mobile device to acquire an image of a given product having a brand associated therewith. The system may include a promotion processing server to obtain the acquired image of the given product from the mobile wireless device, and use image recognition to determine the brand associated with the given product based upon the acquired image. The server may also operate a chatbot with the user devices. The chatbot may include a social media wall having user-obtained images of different products, and each different product may be associated with the brand. The server may add the acquired image to the social media wall and solicit voting, within the chatbot and from the user devices, for a favored image on the social media wall, and determine and communicate a reward value to the mobile device based upon the voting.

26 Claims, 6 Drawing Sheets

(56) References Cited

U.S. PATENT DOCUMENTS

| | | | |
|---|---|---|---|
| 2003/0014269 A1* | 1/2003 | Malkin | G06Q 30/0633 |
| | | | 705/23 |
| 2006/0046712 A1* | 3/2006 | Shamp | H04W 4/12 |
| | | | 455/426.1 |
| 2010/0076836 A1* | 3/2010 | Giordano | G06Q 20/20 |
| | | | 705/14.38 |
| 2012/0271712 A1* | 10/2012 | Katzin | G06Q 20/3274 |
| | | | 705/14.51 |
| 2015/0215373 A1 | 7/2015 | Marovets | |
| 2017/0293938 A1* | 10/2017 | Escher | G06K 9/344 |
| 2017/0295210 A1* | 10/2017 | Choi | H04L 65/1069 |
| 2018/0248817 A1* | 8/2018 | Licht | H04L 51/02 |
| 2018/0287985 A1* | 10/2018 | Sabet | H04L 51/26 |

* cited by examiner

PROMOTION PROCESSING SYSTEM INCLUDING CHATBOT BASED IMAGE VOTING AND RELATED METHODS

TECHNICAL FIELD

The present invention relates to the field of electronics, and more particularly, to chatbot based communications and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

An electronic messenger program or chatbot is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A chatbot may be particularly useful for customer service or information acquisition applications.

SUMMARY

A promotion processing system may include a plurality of user devices that may include at least one mobile wireless communications device configured to acquire an image of at least one given product having a brand associated therewith. The promotion processing system may also include a promotion processing server configured to obtain the acquired image of the at least one given product from the at least one mobile wireless communications device, and use image recognition to determine the brand associated with the at least one given product based upon the acquired image. The promotion processing server may also be configured to operate a chatbot with the plurality of user devices. The chatbot may include a social media wall having a plurality of user-obtained images of different products, and each different product may be associated with the brand. The promotion processing server may also add the acquired image to the social media wall. The promotion processing server may also be configured to solicit voting, within the chatbot and from the plurality of user devices, for a favored image from among the plurality of images on the social media wall, and determine and communicate a reward value to the at least one mobile wireless communications device based upon the voting.

The reward value may include reward points. The reward value may include a digital coupon, for example.

The promotion processing server may be configured to determine the reward value based upon a number of votes received, for example. The at least one given product may include a plurality of given products, and the promotion processing server may be configured to determine a number of given products within the acquired image and determine the reward value based upon the number of given products within the acquired image, for example. The promotion processing server may be configured to determine whether the acquired image corresponds to a most favored image, and determine and communicate a reward value to the at least one mobile wireless communications device based upon the acquired image corresponding to the most favored image.

The at least one mobile wireless communications device may include a housing, a camera carried by the housing, wireless communications circuitry carried by the housing, and a controller coupled to the camera and the wireless communications circuitry. The controller may be configured to acquire the image of at least one given product via the camera, and wirelessly communicate, via the wireless communications circuitry, the acquired image to the promotion processing server. The promotion processing server may be configured to obtain the acquired image of the at least one given product from the at least one mobile wireless communications device via the chatbot, for example.

A method aspect is directed to a method of processing a promotion. The method may include using a promotion processing server to obtain an acquired image of at least one given product from at least one mobile wireless communications device of a plurality of user devices. The at least one given product may have a brand associated therewith. The method may also include using the promotion processing server to use image recognition to determine the brand associated with the at least one given product based upon the acquired image and operate a chatbot with the plurality of user devices. The chatbot may include a social media wall having a plurality of user-obtained images of different products, and each different product may be associated with the brand. The method may also include using the promotion processing server to add the acquired image to the social media wall, solicit voting, within the chatbot and from the plurality of user devices, for a favored image from among the plurality of images on the social media wall, and determine and communicate a reward value to the at least one mobile wireless communications device based upon the voting.

A computer readable medium aspect is directed to a non-transitory computer readable medium for processing a promotion. The non-transitory computer readable medium includes computer executable instructions that when executed by a processor cause the processor to perform operations. The operations may include obtaining an acquired image of at least one given product from at least one mobile wireless communications device of a plurality of user devices, wherein the at least one given product may have a brand associated therewith. The operations may also include using image recognition to determine the brand associated with the at least one given product based upon the acquired image, and operating a chatbot with the plurality of user devices. The chatbot may include a social media wall having a plurality of user-obtained images of different products, and each different product may be associated with the brand. The operations may further include adding the acquired image to the social media wall and soliciting voting, within the chatbot and from the plurality of user devices, for a favored image from among the plurality of images on the social media wall. The operations may also include determining and communicating a reward value to the at least one mobile wireless communications device based upon the voting.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 2:
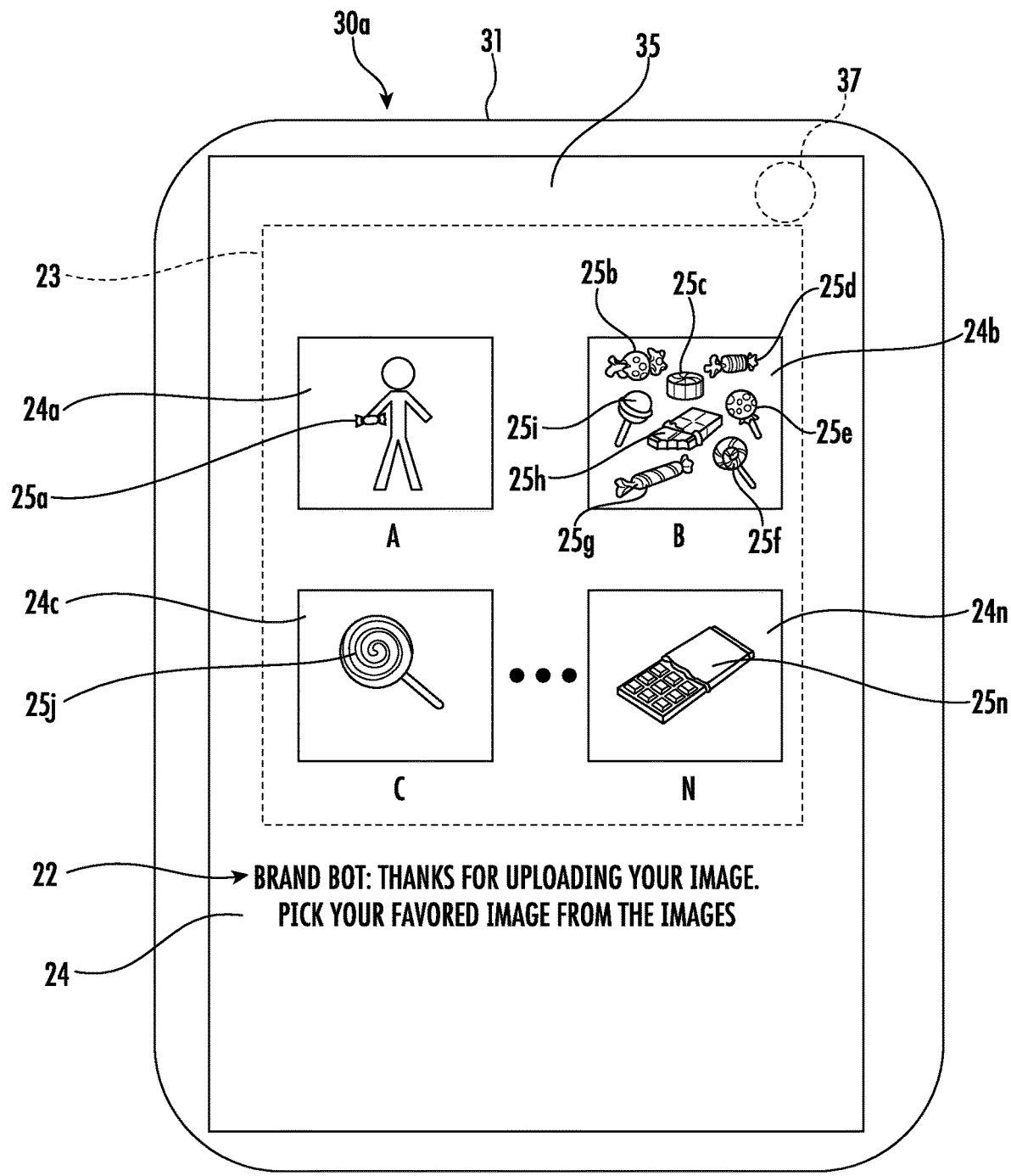
FIG. 2 is a schematic diagram of a portion of a promotion processing system in accordance with an embodiment.
Figure 3:
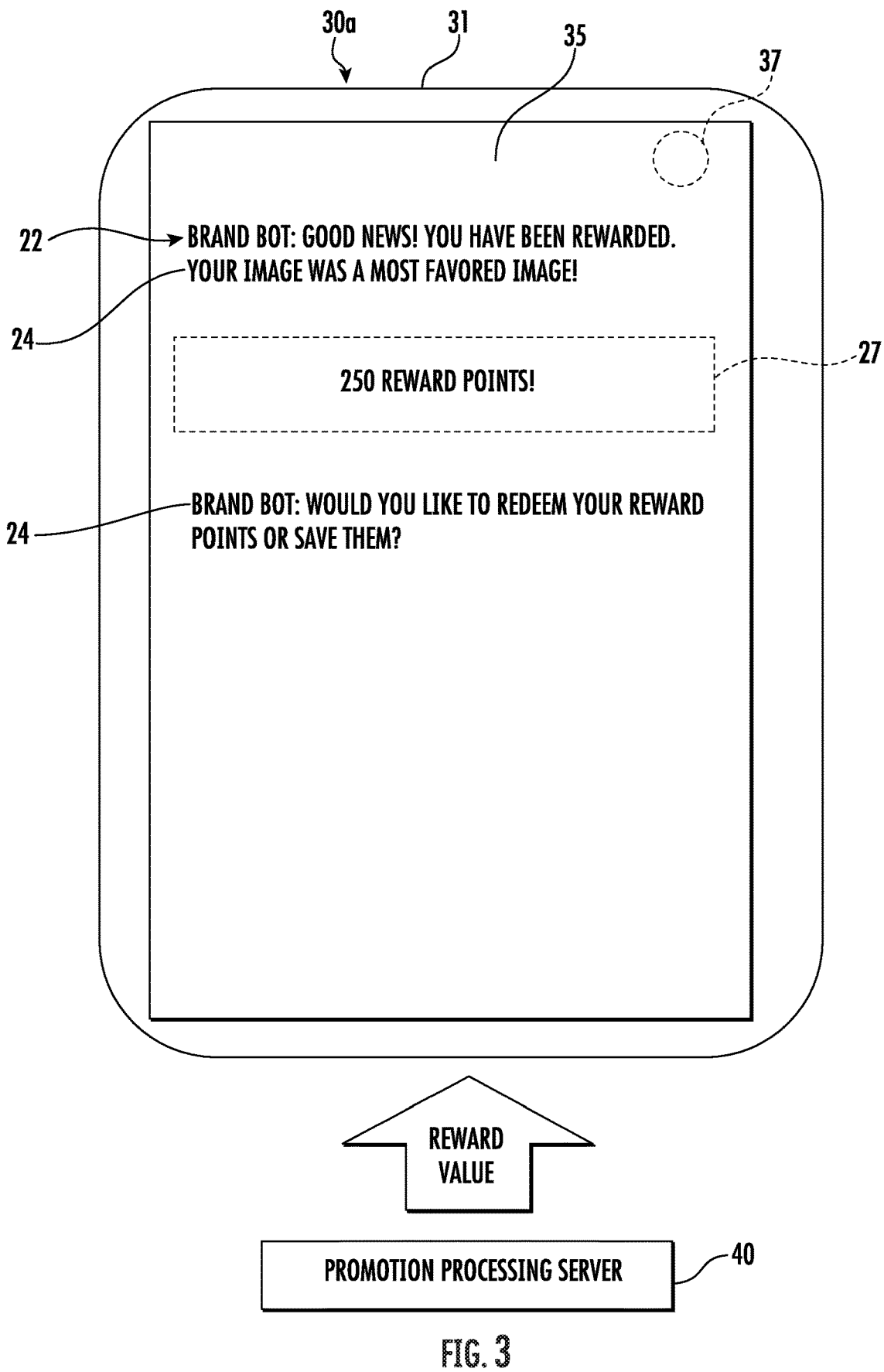
FIG. 3 is a schematic diagram of a portion of a promotion processing system in accordance with an embodiment.
Figure 4:
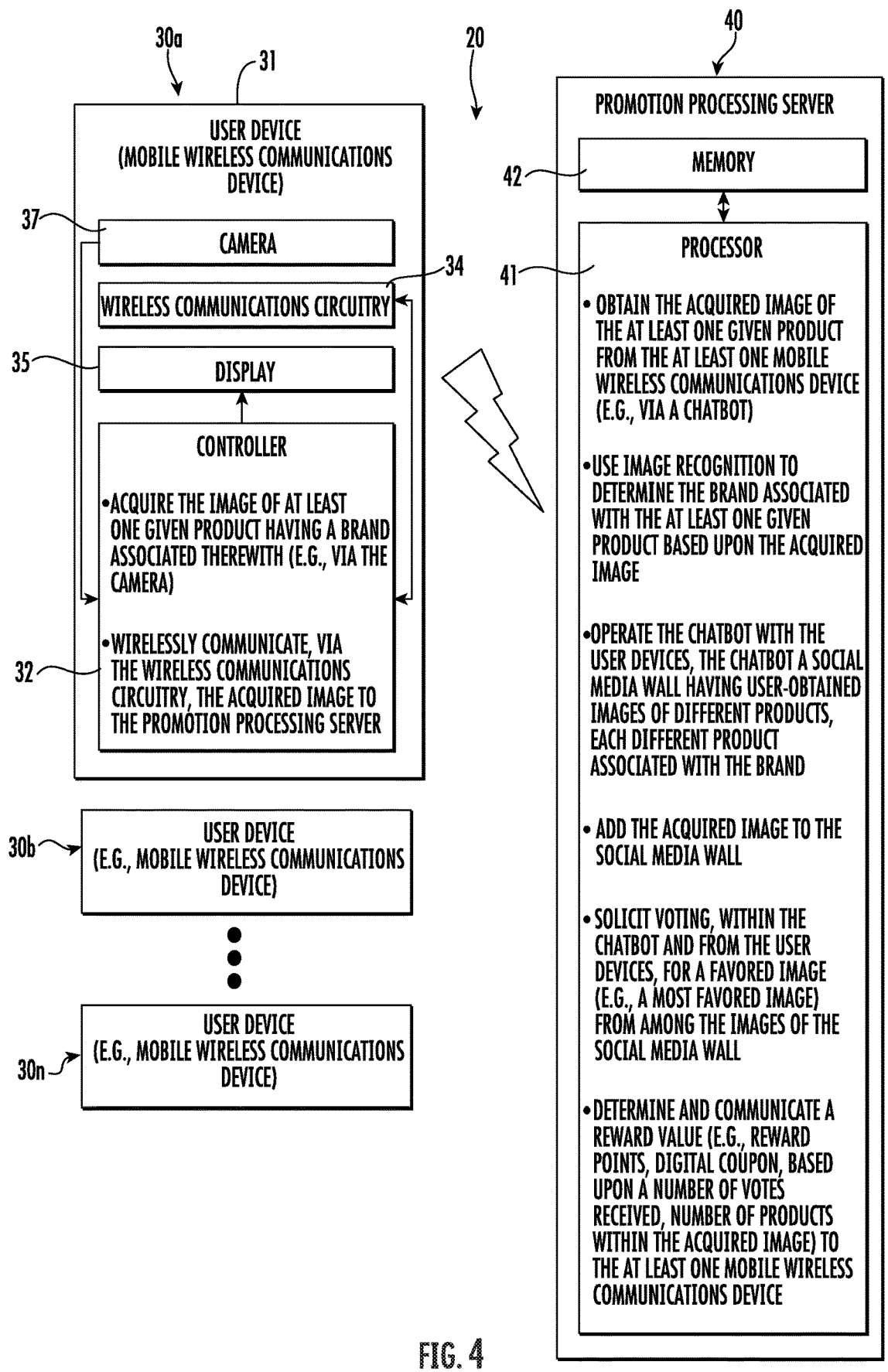
FIG. 4 is a schematic block diagram of a promotion processing system in accordance with an embodiment.

Referring initially to FIGS. 1-4, a system 20 for processing a promotion includes user devices 30a-30n. At least one of the user devices 30a-30n is in the form of a mobile wireless communications device 30a. Each mobile wireless communications device 30a illustratively includes a portable housing 31, a controller 32 and wireless communications circuitry 34 coupled to the controller (FIG. 4). The mobile wireless communications device 30a also includes a display 35, such as, for example, a touch display, carried by the portable housing 31 and coupled to the controller 32 (FIG. 4). The mobile wireless communications device 30a may include one or more input devices, for example, a camera 37 and other types of input or output devices. The mobile wireless communications device 30a may be a mobile phone or smartphone, as will be appreciated by those skilled in the art. Others of the user devices 30b-30n may be in the form of another type of user device, for example, a laptop or desktop computer, a tablet computer, or a wearable device.

Figure 1:
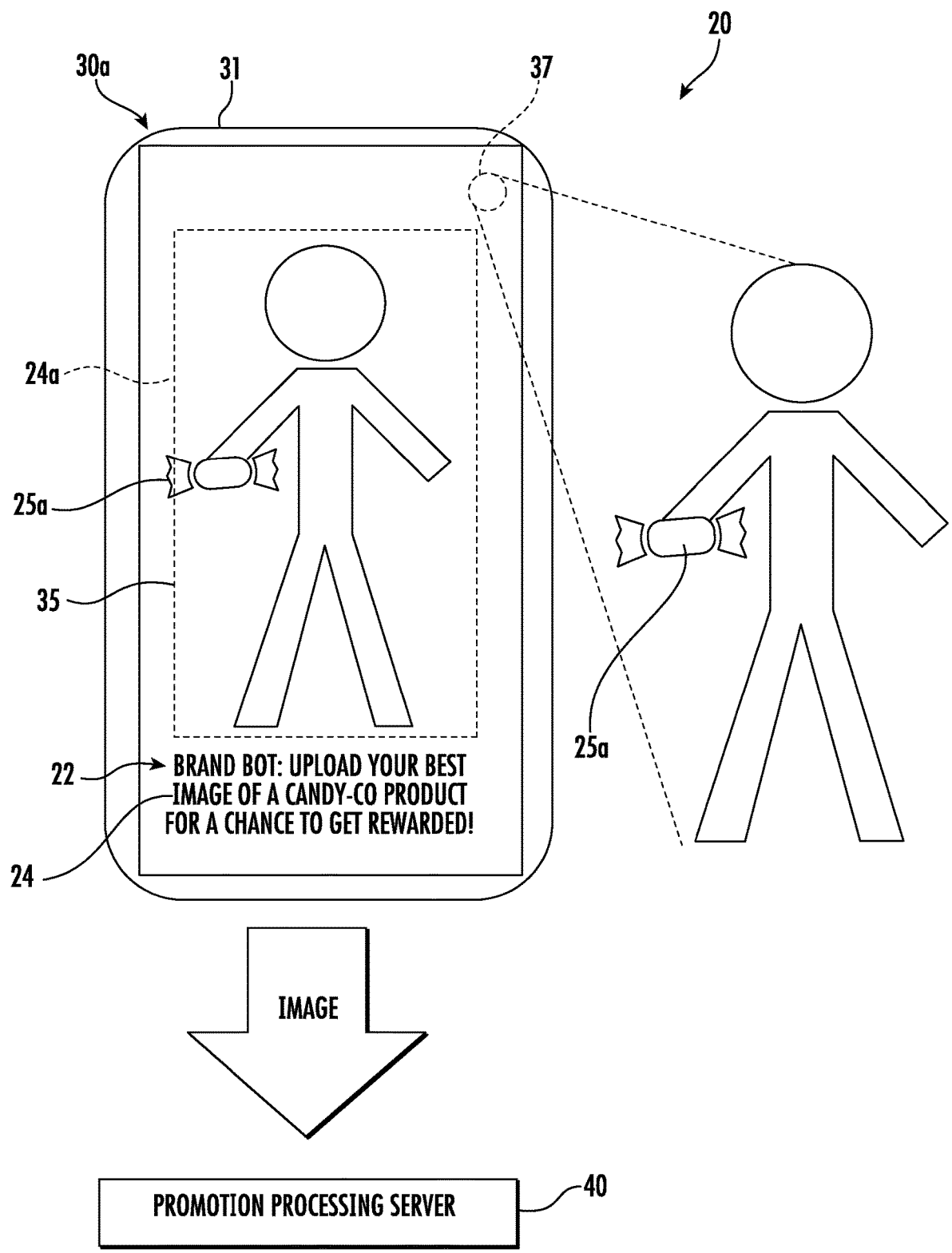
FIG. 1 is a schematic diagram of a portion of a promotion processing system in accordance with an embodiment.

Each mobile wireless communications device 30a acquires an image 24a of a given product 25a, for example, in a given environment, as a close-up image, with artistic enhancements, etc. The given product 25a has a brand associated therewith. For example, in an exemplary embodiment, the acquired image 24a may include a person holding a candy bar "Choco-Bar" of the brand "Candy Co" (FIG. 1). More particularly, the controller 32 acquires the image 24a of the given product 25a via the camera 37 and wirelessly communicates, via the wireless communications circuitry 34, the acquired image to a promotions processing server 40 of the promotions processing system 20. In some embodiments, the mobile wireless communications device 30a may acquire an image that includes more than one product of the brand.

The promotion processing server 40 is communicatively coupled to the user devices 30a-30n (FIG. 4). The promotion processing server 40 includes a processor 41 and a memory 42 associated with the processor. While operations of the promotion processing server 40 are described herein, it will be appreciated that operations of the promotion processing server a performed by way of cooperation between the processor 41 and the memory 42.

Figure 5:
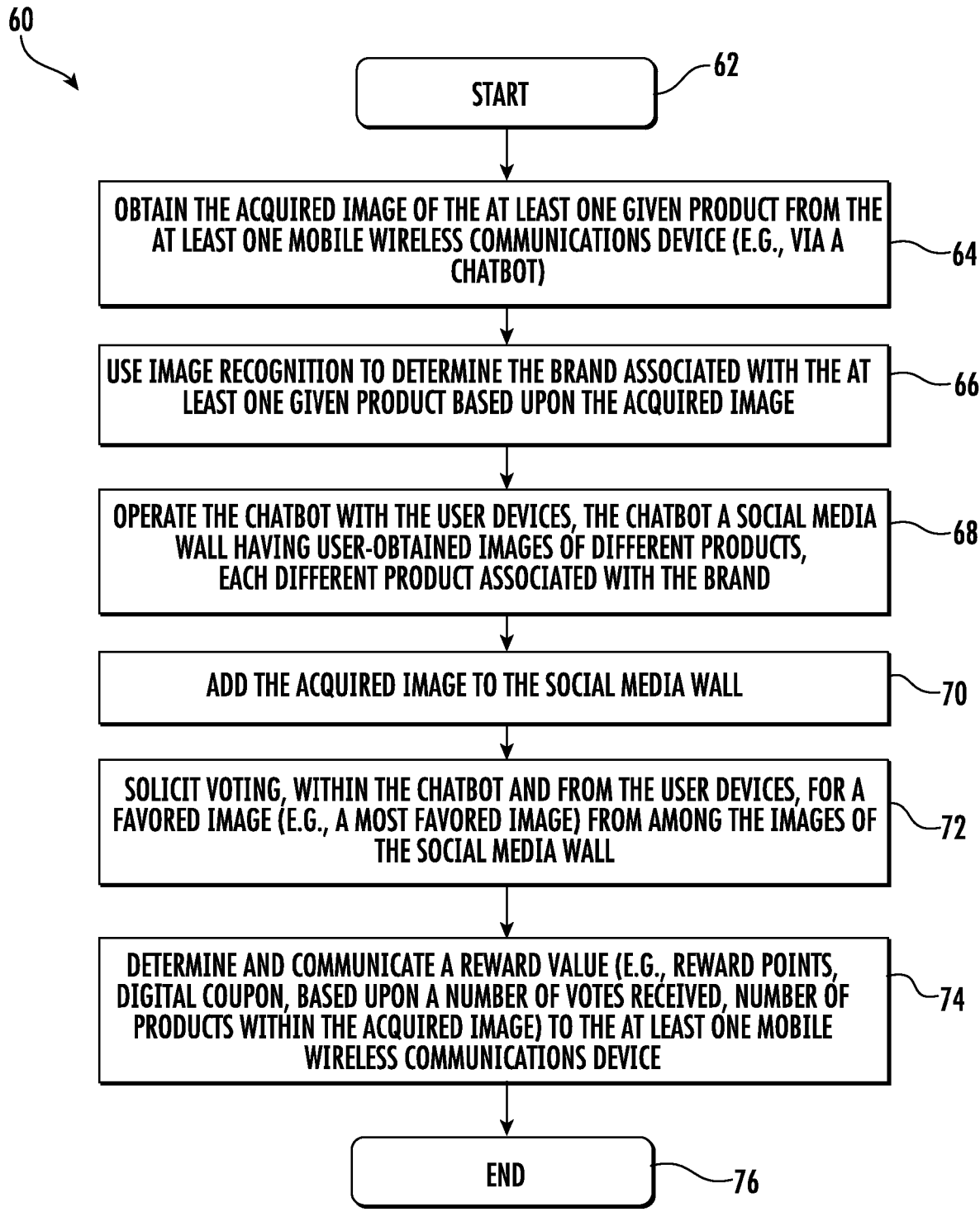
FIG. 5 is a flow diagram of operation of the promotion processing server of FIG. 4.

Referring now additionally to the flowchart 60 in FIG. 5, beginning at Block 62, operations of the promotion processing system 20 with respect to the promotion processing server 40 will now be described. At Block 64, the promotion processing server 40 obtains the acquired image 24a of the given product 25a from the mobile wireless communications device 30a, for example, by way of a chatbot 22 operated by the promotion processing server and with the user devices or mobile wireless communications devices 30a-30n. While an image being obtained is described with respect to a single mobile wireless communications device 30a, the promotion processing server 40 may obtain images of a product from the brand from more than one mobile wireless communications device 30a. Moreover, while certain operations described herein are with respect to a single mobile wireless communications device 30a, those operations may be applicable to any or all mobile wireless communications devices 30b-30n At Block 66, the promotion processing server 40 uses image recognition to determine the brand associated with the given product 25a based upon the acquired image 24a. For example, the promotion processing server 40 may recognize logos, photos, packaging color or size, or text within the image to determine the brand. If, at Block 66, the brand cannot be determined or, more particularly, the image does not include a product of the brand, the particular image may be discarded by the promotion processing server 40.

The promotion processing server 40, at Block 68, operates the chatbot 22 with the user devices 30a-30n and the chatbot includes a social media wall 23 that has user-obtained images 24a-24n of different products (FIG. 2). The chatbot 22 may be implemented in the form of a two-way dialog box that permits the given user to communicate by way of typing (i.e., written communication). In some embodiments, the chatbot 22 may operate through voice commands or spoken words. For example, the chatbot 22 may be activated upon selection of, or liking, the promotion from within the social media feed. The chatbot conversation 24 may be inline in the social media feed or may be executed through a messenger program or application associated with the social media feed. The application or program associated with the chatbot 22 may be executed or opened, for example, based upon user selection of the promotion.

Each of the different products 25a-25n is associated with the brand (e.g., "Candy-Co."). In other words, each product is of the same brand, but not necessarily the same product.

The promotion processing server 40 adds the acquired image 24a to the social media wall 23 that includes other acquired images 24b-24n, for example, via the chatbot 22 (Block 70) (FIG. 2). At Block 72, the promotion processing server 40 solicits voting, within the chatbot 22 and from the user devices 30a-30n, for a favored image from among the images 24a-24n on the social media wall 23 (FIG. 2).

The promotion processing server 40 determines and communicates a reward value 27 to one or more mobile wireless communications devices 30a-30n based upon the voting (Block 74) for example, for display on the display 35 of the mobile wireless communications device 30a (FIG. 3). For example, the promotion processing server 40 may determine and communicate a reward value to the mobile wireless communications device 30a-30n associated with the most favored image on the social media wall 23. Of course, in some embodiments, the top most favored images on the social media wall 23 may serve the basis for determining and communicating the reward value 27. The reward value 27 may be determined based upon a number of votes received for the associated image.

In embodiments where a given image 24b includes more than one product 25b-25i of the given brand, the reward value 27 may be determined also based upon the number of given products within the acquired or given image. For example, the more products 25a-25n in a single given image 24a, 24b, 24c, 24n, the more higher the reward value.

The reward value may include or be in the form of reward points 27 (FIG. 3). The reward points 27 may be awarded based upon the number of votes received as a favored image or as described above. The reward points 27 may be redeemable toward a product of the brand or may be redeemable toward another product or portion of a product (e.g., to be combined with additional reward points from other activities or other image voting).

Figure 6:
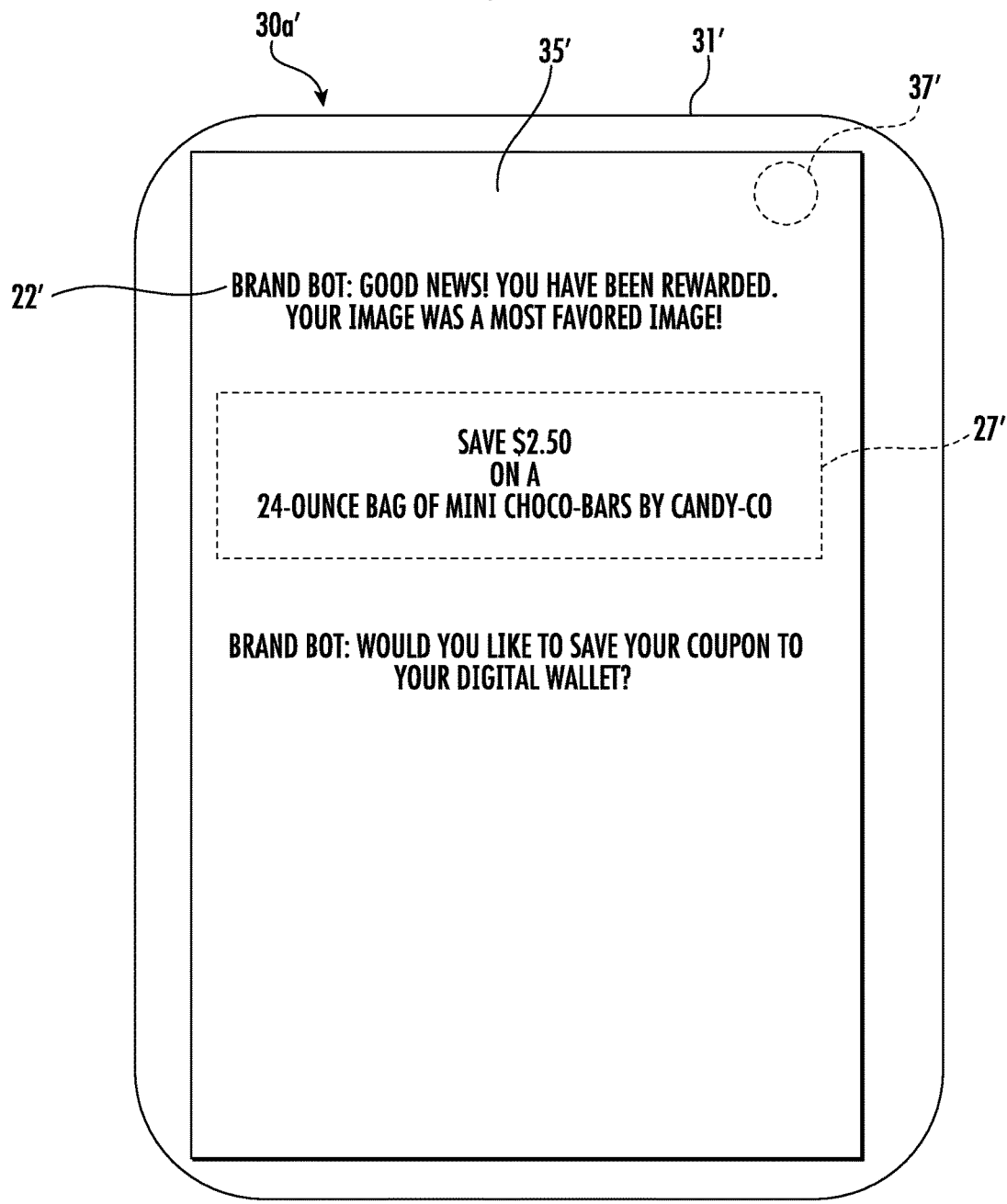
FIG. 6 is a schematic diagram of a portion of a promotion processing system in accordance with another embodiment.

Referring briefly to FIG. 6, the reward value may include or be in the form of a digital promotion 27'. The digital promotion 27' may be in the form of a digital coupon redeemable at a point-of-sale (POS) terminal toward the purchase of a product of the given brand. The value of the digital coupon 27' may be determined as described above. The chatbot 22' may prompt for storing the digital coupon 27' in a digital wallet associated with the given user. In some embodiments, the digital promotion 27' may be in the form of a digital rebate, the value of which may also be determined as described above. In some embodiments, the user may be given the opportunity to select between reward points or a digital promotion. Operations end at Block 76.

A method aspect is directed to a method of processing a promotion. The method includes using a promotion processing server 40 to obtain an acquired image 24a of at least one given product 25a from at least one mobile wireless communications device 30a of a plurality of user devices 30a-30n. The at least one given product 25a may have a brand associated therewith. The method also includes using the promotion processing server 40 to use image recognition to determine the brand associated with the at least one given product 25a based upon the acquired image 24a and operate a chatbot 22 with the plurality of user devices 30a-30n. The chatbot 22 includes a social media wall 23 having a plurality of user-obtained images of different products 25b-25n, and each different product is associated with the brand. The method also includes using the promotion processing server 40 to add the acquired image 24a to the social media wall 23, solicit voting, within the chatbot 22 and from the plurality of user devices 30a-30n, for a favored image from among the plurality of images on the social media wall, and determine and communicate a reward value 27 to the at least one mobile wireless communications device 30a based upon the voting.

A computer readable medium aspect is directed to a non-transitory computer readable medium for processing a promotion. The non-transitory computer readable medium includes computer executable instructions that when executed by a processor 41 cause the processor to perform operations. The operations include obtaining an acquired image 24a of at least one given product 25a from at least one mobile wireless communications device 30a of a plurality of user devices 30a-30n, wherein the at least one given product may have a brand associated therewith. The operations also include using image recognition to determine the brand associated with the at least one given product 25a based upon the acquired image 24a, and operating a chatbot 22 with the plurality of user devices 30a-30n. The chatbot 22 includes a social media wall 23 having a plurality of user-obtained images 24a-24n of different products 25a-25n, and each different product is associated with the brand. The operations further include adding the acquired image 24a to the social media wall 23 and soliciting voting, within the chatbot 22 and from the plurality of user devices 30a-30n, for a favored image from among the plurality of images on the social media wall. The operations also include determining and communicating a reward value 27 to the at least one mobile wireless communications device 30a based upon the voting.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
a plurality of user devices each associated with a given user and comprising at least one mobile wireless communications device configured to acquire an image of at least one given product having a brand associated therewith; and
a promotion processing server configured to
obtain the acquired image of the at least one given product from the at least one mobile wireless communications device,
use image recognition to determine the brand associated with the at least one given product based upon the acquired image, the image being recognized by at least recognizing one of a logo, a photo, a color of a package, a size of the package, and recognized text within the acquired image,
operate a chatbot with the plurality of user devices in a form of a two-way dialog that permits the given user to communicate with the promotion processing server as if the given user were communicating with a human user, the chatbot including a social media wall having a plurality of user-obtained images of different products, each different product associated with the brand,
add the acquired image to the social media wall,
solicit voting, within the chatbot and from the plurality of user devices, for a favored image from among the plurality of images on the social media wall, and
determine and communicate a reward value to the at least one mobile wireless communications device based upon the voting.

2. The promotion processing system of claim 1 wherein the reward value comprises reward points.

3. The promotion processing system of claim 1 wherein the reward value comprises a digital coupon.

4. The promotion processing system of claim 1 wherein the promotion processing server is configured to determine the reward value based upon a number of votes received.

5. The promotion processing system of claim 1 wherein the at least one given product comprises a plurality of given products; and wherein the promotion processing server is configured to determine a number of given products within the acquired image and determine the reward value based upon the number of given products within the acquired image.

6. The promotion processing system of claim 1 wherein the promotion processing server is configured to determine whether the acquired image corresponds to a most favored image, and determine and communicate a reward value to the at least one mobile wireless communications device based upon the acquired image corresponding to the most favored image.

7. The promotion processing system of claim 1 wherein the at least one mobile wireless communications device comprises:
 a housing;
 a camera carried by the housing;
 wireless communications circuitry carried by the housing; and
 a controller coupled to the camera and the wireless communications circuitry and configured to
  acquire the image of at least one given product via said camera, and
  wirelessly communicate, via the wireless communications circuitry, the acquired image to the promotion processing server.

8. The promotion processing system of claim 1 wherein the promotion processing server is configured to obtain the acquired image of the at least one given product from the at least one mobile wireless communications device via the chatbot.

9. A promotion processing server comprising:
 a processor and an associated memory configured to
  obtain an acquired image of at least one given product from at least one mobile wireless communications device of a plurality of user devices each associated with a given user, the at least one given product having a brand associated therewith,
  use image recognition to determine the brand associated with the at least one given product based upon the acquired image, the image being recognized by at least recognizing one of a logo, a photo, a color of a package, a size of the package, and recognized text within the acquired image,
  operate a chatbot with the plurality of user devices in a form of a two-way dialog that permits the given user to communicate with the promotion processing server as if the given user were communicating with a human user, the chatbot including a social media wall having a plurality of user-obtained images of different products, each different product associated with the brand,
  add the acquired image to the social media wall,
  solicit voting, within the chatbot and from the plurality of user devices, for a favored image from among the plurality of images on the social media wall, and
  determine and communicate a reward value to the at least one mobile wireless communications device based upon the voting.

10. The promotion processing server of claim 9 wherein the reward value comprises reward points.

11. The promotion processing server of claim 9 wherein the reward value comprises a digital coupon.

12. The promotion processing server of claim 9 wherein the processor is configured to determine the reward value based upon a number of votes received.

13. The promotion processing server of claim 9 wherein the at least one given product comprises a plurality of given products; and wherein the processor is configured to determine a number of given products within the acquired image and determine the reward value based upon the number of given products within the acquired image.

14. The promotion processing server of claim 9 wherein the processor is configured to determine whether the acquired image corresponds to a most favored image, and determine and communicate a reward value to the at least one mobile wireless communications device based upon the acquired image corresponding to the most favored image.

15. A method of processing a promotion comprising:
 using a promotion processing server to
  obtain an acquired image of at least one given product from at least one mobile wireless communications device of a plurality of user devices each associated with a given user, the at least one given product having a brand associated therewith,
  use image recognition to determine the brand associated with the at least one given product based upon the acquired image, the image being recognized by at least recognizing one of a logo, a photo, a color of a package, a size of the package, and recognized text within the acquired image,
  operate a chatbot with the plurality of user devices in a form of a two-way dialog that permits the given user to communicate with the promotion processing server as if the given user were communicating with a human user, the chatbot including a social media wall having a plurality of user-obtained images of different products, each different product associated with the brand,
  add the acquired image to the social media wall,
  solicit voting, within the chatbot and from the plurality of user devices, for a favored image from among the plurality of images on the social media wall, and
  determine and communicate a reward value to the at least one mobile wireless communications device based upon the voting.

16. The method of claim 15 wherein the reward value comprises reward points.

17. The method of claim 15 wherein the reward value comprises a digital coupon.

18. The method of claim 15 wherein using the promotion processing server comprises using the promotion processing server to determine the reward value based upon a number of votes received.

19. The method of claim 15 wherein the at least one given product comprises a plurality of given products; and wherein using the promotion processing server comprises using the promotion processing server to determine a number of given products within the acquired image and determine the reward value based upon the number of given products within the acquired image.

20. The method of claim 15 wherein using the promotion processing server comprises using the promotion processing server to determine whether the acquired image corresponds to a most favored image, and determine and communicate a reward value to the at least one mobile wireless communications device based upon the acquired image corresponding to the most favored image.

21. A non-transitory computer readable medium for processing a promotion, the non-transitory computer readable medium comprising computer executable instructions that when executed by a processor cause the processor to perform operations comprising:
obtaining an acquired image of at least one given product from at least one mobile wireless communications device of a plurality of user devices each associated with a given user, the at least one given product having a brand associated therewith;
using image recognition to determine the brand associated with the at least one given product based upon the acquired image, the image being recognized by at least recognizing one of a logo, a photo, a color of a package, a size of the package, and recognized text within the acquired image;
operating a chatbot with the plurality of user devices in a form of a two-way dialog that permits the given user to communicate with the promotion processing server as if the given user were communicating with a human user, the chatbot including a social media wall having a plurality of user-obtained images of different products, each different product associated with the brand;
adding the acquired image to the social media wall;
soliciting voting, within the chatbot and from the plurality of user devices, for a favored image from among the plurality of images on the social media wall; and
determining and communicating a reward value to the at least one mobile wireless communications device based upon the voting.

22. The non-transitory computer readable medium of claim 21 wherein the reward value comprises reward points.

23. The non-transitory computer readable medium of claim 21 wherein the reward value comprises a digital coupon.

24. The non-transitory computer readable medium of claim 21 wherein the operations comprise determining the reward value based upon a number of votes received.

25. The non-transitory computer readable medium of claim 21 wherein the at least one given product comprises a plurality of given products; and wherein the operations comprise determining a number of given products within the acquired image and determining the reward value based upon the number of given products within the acquired image.

26. The non-transitory computer readable medium of claim 21 wherein the operations comprise determining whether the acquired image corresponds to a most favored image, and determining and communicating a reward value to the at least one mobile wireless communications device based upon the acquired image corresponding to the most favored image.

* * * * *